(12) United States Patent
Marks

(10) Patent No.: US 6,343,442 B1
(45) Date of Patent: Feb. 5, 2002

(54) FLATTENABLE FOLDABLE BOOM HINGE

(75) Inventor: Geoff Marks, Santa Barbara, CA (US)

(73) Assignee: TRW-Astro Aerospace Corporation, Carpinteria, CA (US)

( * ) Notice: Subject to any disclaimer, the term of this patent is extended or adjusted under 35 U.S.C. 154(b) by 0 days.

(21) Appl. No.: 09/374,373

(22) Filed: Aug. 13, 1999

(51) Int. Cl.$^7$ ............................................... B64G 1/44
(52) U.S. Cl. ........................................... 52/71; 244/173
(58) Field of Search ............................... 52/70, 71, 111; 136/292, 245; 244/173; 160/135, 229.1, 231.1, 231.2

(56) References Cited

U.S. PATENT DOCUMENTS

| | | | |
|---|---|---|---|
| 3,677,508 A | * | 7/1972 | Dillard et al. ............. 52/108 X |
| 3,690,080 A | | 9/1972 | Dillard |
| 3,733,758 A | * | 5/1973 | Maier et al. .................... 52/113 |
| 4,148,163 A | * | 4/1979 | Chenin et al. .................. 52/71 |
| 4,384,163 A | | 5/1983 | Rauschenbach et al. |
| 4,446,662 A | | 5/1984 | Humphries |
| 4,480,415 A | * | 11/1984 | Truss ........................... 52/108 |
| 4,613,870 A | | 9/1986 | Stonier |
| 4,666,107 A | * | 5/1987 | Berry .......................... 136/292 |
| 5,319,905 A | * | 6/1994 | Szirtes .......................... 52/108 |
| 5,520,747 A | * | 5/1996 | Marks .......................... 136/245 |
| 5,720,452 A | * | 2/1998 | Mutshcler ............... 136/292 X |
| 5,785,280 A | * | 7/1998 | Baghdasarian .......... 136/292 X |
| 5,833,176 A | * | 11/1998 | Rubin et al. ............. 136/245 X |
| 5,857,648 A | * | 1/1999 | Dailey et al. ............. 52/109 X |
| 6,102,339 A | * | 8/2000 | Wu et al. .................... 244/173 |

* cited by examiner

Primary Examiner—David M. Purol
(74) Attorney, Agent, or Firm—Knobbe, Martens, Olson & Bear LLP

(57) ABSTRACT

A boom assembly for a rocket-launched spacecraft, the boom assembly comprising a plurality of rigid sections and a plurality of elastic sections that pivotally connect each of the rigid sections together so as to enable the boom assembly to be folded into a storage configuration and so as to enable the boom assembly to be automatically unfolded into a deployed configuration that provides the spacecraft with a large rigid extending platform. At least one of the rigid sections is mounted to the spacecraft so as to secure the boom assembly to the spacecraft. In one embodiment, a plurality of extendable components, such as solar panels and radar antennae, are mounted to the rigid sections so as to allow for storing and deploying the extendable components. In another embodiment, there may be no components mounted other than a length of wire or a length of metal tape which will allow the boom to act as an antenna. In the storage configuration, the boom assembly is folded about the elastic sections and secured with a releasable tie-down device. This allows the rigid sections to be positioned adjacent each other in an accordion manner so as to enable the boom assembly to be stowed into a small space of a launch vehicle and so as to store elastic energy in the deformed elastic sections. After the spacecraft is launched, the tie-down device is released so as to release the stored elastic energy of the elastic sections, thereby urging the boom assembly into the deployed configuration.

52 Claims, 9 Drawing Sheets

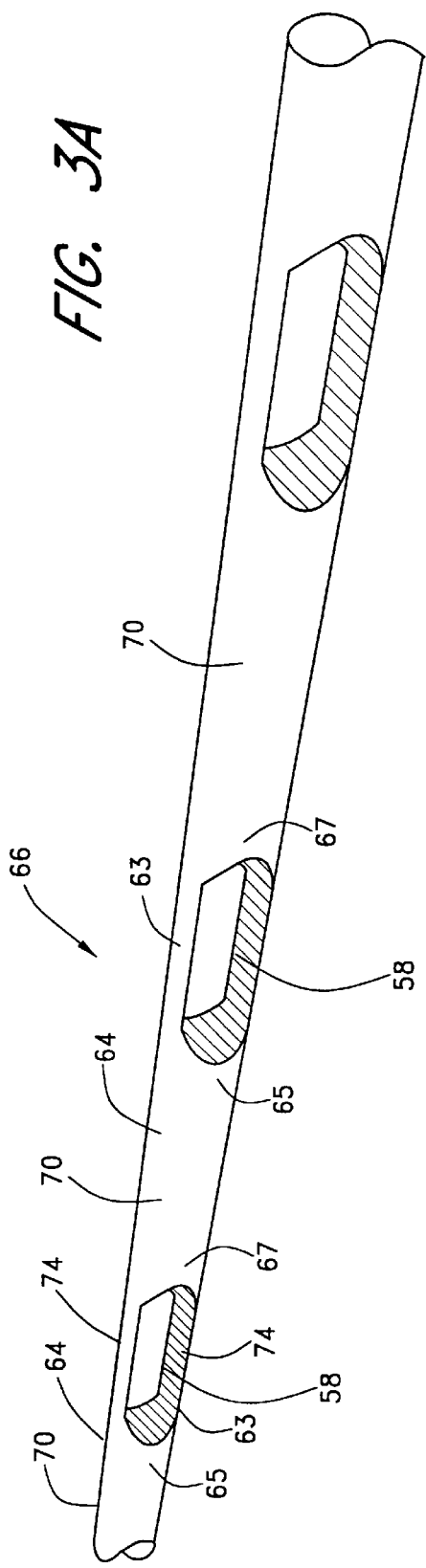
FIG. 3A
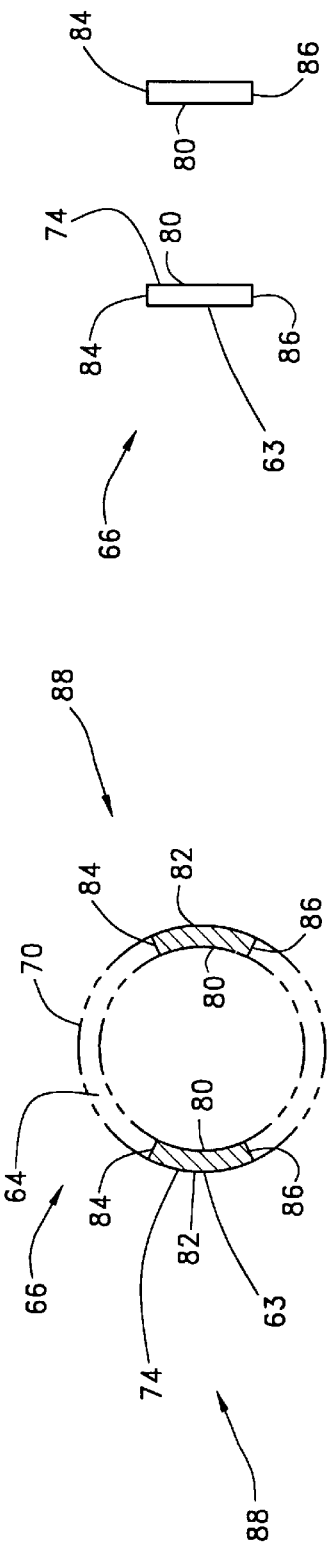
FIG. 3E
FIG. 3D

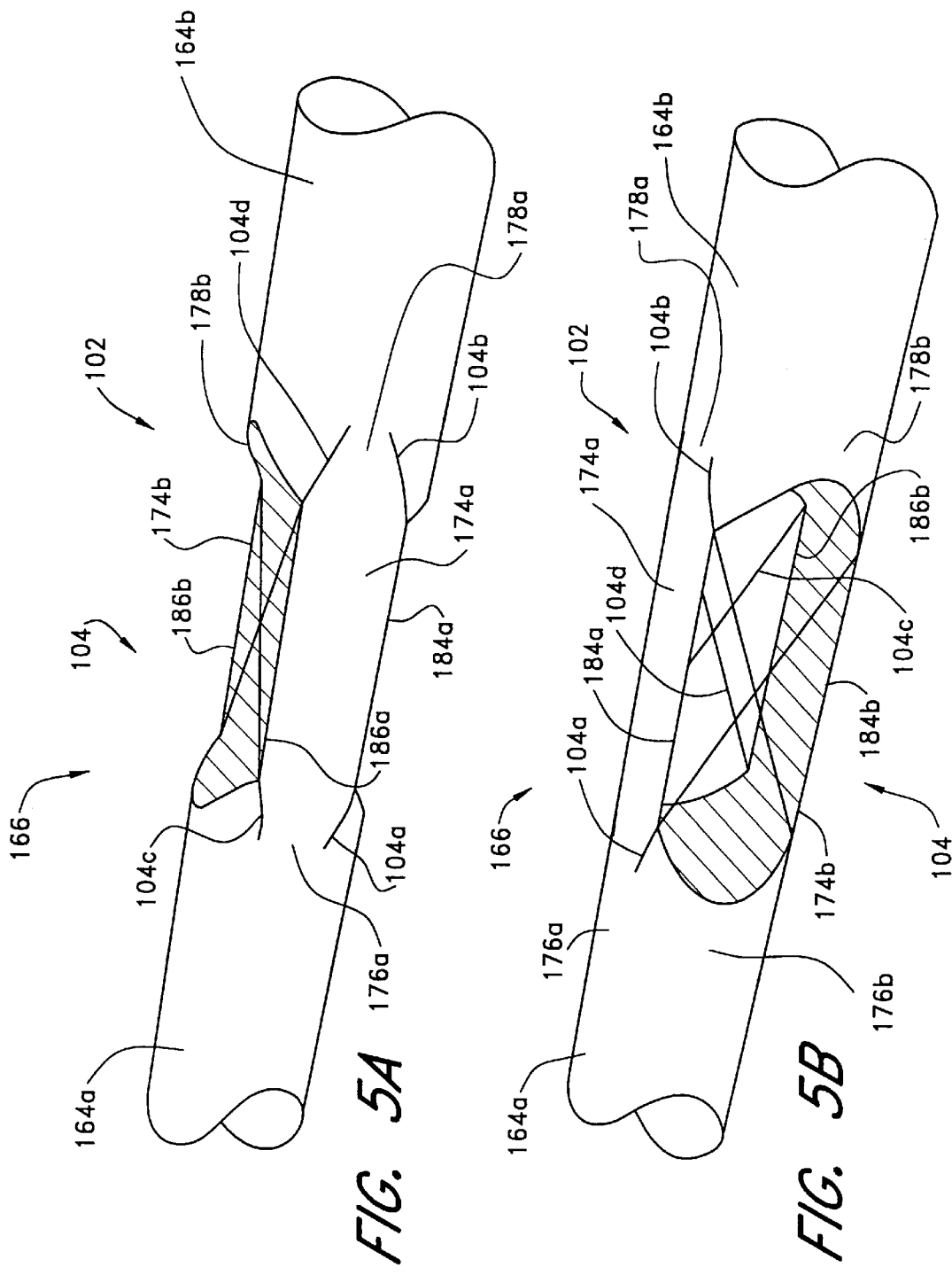

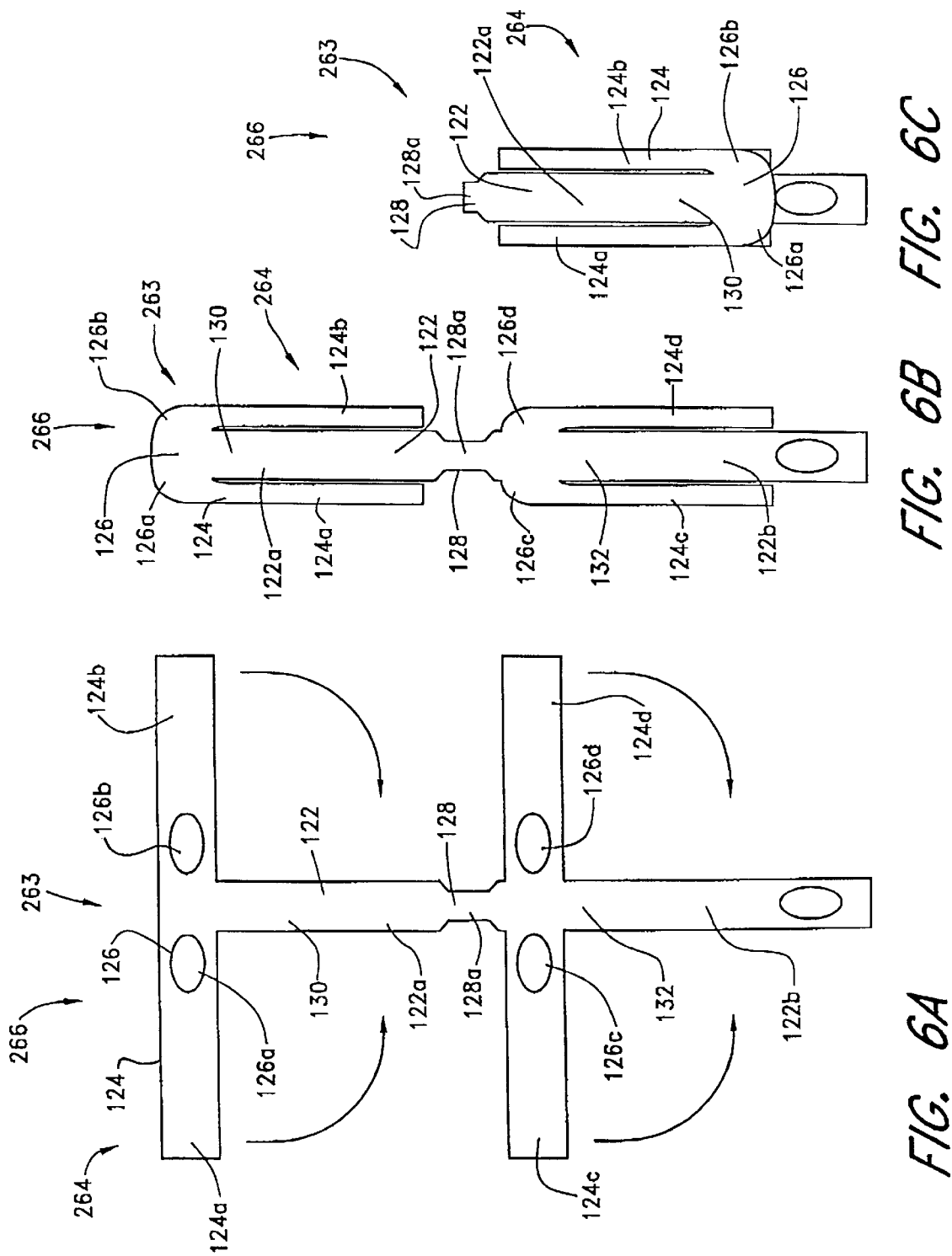

FLATTENABLE FOLDABLE BOOM HINGE

BACKGROUND OF THE INVENTION

1. Field of the Invention

The present invention relates to rocket-launched spacecraft and, in particular, relates to boom assemblies that deploy extendable components of the spacecraft.

2. Description of the Related Art

Rocket-launched spacecraft, which include orbiting satellites and deep space probes, perform increasingly complex tasks. In particular, telecommunication satellites enable vast amounts of information, including voice and data, to be sent and received around the globe. In other examples, satellites equipped with earth imaging devices enable weather forecasters to more accurately study and predict global weather patterns. Furthermore, since satellites are positioned outside of the earth's atmosphere, they provide an ideal platform for observing and studying the universe. Additionally, deep space probes equipped with increasingly advanced scientific instrumentation that are launched into a non-earthbound trajectory enable scientists to obtain heretofore unobtainable data about the solar system.

The rocket-launched spacecraft is launched into a preferred trajectory by rocket-propelled means that includes positioning the spacecraft into a relatively small capsule of a rocket-propelled vehicle. Thus, the typical spacecraft is required to be configurable between a storage configuration that enables the spacecraft to be positioned within the capsule of the rocket-propelled vehicle and a deployed configuration that enables the spacecraft to function in a desired manner while in outer space.

Thus, subsequent to the launching of the spacecraft, the spacecraft is typically configured for use by deploying an assembly of extendable components. For example, the assembly of extendable components may comprise an extended solar panel array that is used to convert collected solar radiation into electrical energy. In another example, the assembly of extendable components may comprise an extendable antenna assembly that is used to transmit and receive electromagnetic signals to and from a plurality of earth-based installations.

To deploy each assembly of extendable components, the typical spacecraft often utilizes a boom assembly. In particular, the assembly of extendable components is usually mounted to the extendable boom assembly which is adapted to fold-up in the storage configuration and fold-out in the deployed configuration. Furthermore, the boom assembly also serves as a support structure for supporting the assembly of extendable components while the boom assembly is in the deployed configuration. Moreover, although the spacecraft is often in a weightless environment, forces applied by rocket thrusters of the spacecraft that are sometimes used to correct the trajectory of the spacecraft may create considerable stress throughout the boom assembly. Therefore the boom assembly is required to be rigid and have sufficient structural integrity while in the deployed configuration.

As increasingly advanced types of spacecraft are being developed, it has become apparent that known types of boom assemblies provide insufficient capabilities. In particular, deep space probes currently being designed require boom assemblies that are capable of extending to unprecedentedly large sizes. Furthermore, the required boom assembly must be lightweight so as to reduce the amount of fuel that is needed to launch the spacecraft into the required trajectory, be reducible to a small size so as to enable the large boom assembly to fit into the small capsule, and have a high degree of strength when fully deployed. Moreover, since cost is a major consideration in the design of spacecraft, it is preferable for the boom assembly to have a simple design so as to reduce the manufacturing costs of the boom assembly.

Hence, there is a continuing need for extendable boom assemblies for spacecraft that are lightweight and are readily foldable into a compacted storage configuration for launch of the spacecraft. The boom assembly should also be readily deployable into an extended configuration upon the spacecraft reaching a desired trajectory and have sufficient strength to maintain spacecraft components in a desired deployed configuration.

SUMMARY OF THE INVENTION

The aforementioned needs are satisfied by the spacecraft boom assembly of the present invention comprised of an elongate boom having at least one opening formed at a location along the boom. In particular, the at least one opening defines at least one folding region so as to permit the elongate boom to be folded about the at least one folding region to thereby reduce the length of the elongate boom. Furthermore, the elongate boom is formed of a resilient material so as to store elastic energy when the elongate boom is in the folded configuration to thereby bias the folded elongate boom into an unfolded deployed state.

In another aspect of the invention, the aforementioned needs are satisfied by the spacecraft boom assembly of the present invention having a storage and a deployed configuration. In particular, the assembly comprises a first and a second mounting member and a foldable interconnection connected between the first and the second mounting members. Furthermore, the foldable interconnection is formed of an elastic material that is biased into a deployed configuration wherein the first and second mounting members are maintained in a deployed configuration such that the foldable interconnection rigidly maintains the first and second mounting members in a desired orientation with respect to each other such that the length of the boom assembly is a deployed length. Moreover, the foldable interconnection is adapted to permit release from the deployed configuration so that the first and second mounting members can be positioned in a storage configuration wherein the first and second mounting members are positioned so as to reduce the length of the boom assembly.

In another aspect of the invention, the aforementioned needs are satisfied by the elongate structural support member for a spacecraft comprising a first rigid member having a first and a second end, a second rigid member having a first and a second end, and a foldable connecting member integrally attached to the first ends of the first and second rigid members so as to interconnect the first and second rigid members. In particular, the foldable connecting member is bendable so as to allow the first and second rigid members to be positioned substantially adjacent each other substantially along the lengths of the first and second rigid members in a storage configuration. Moreover, the foldable connecting member is biased towards a deployed configuration wherein the first rigid member is rotated about the connecting member with respect to the second rigid member so that the first and second rigid members extend outward from the foldable connecting member.

In another aspect of the invention, the aforementioned needs are satisfied by the boom assembly for a spacecraft comprising a first boom sub-assembly having a first and a second rigid section with a folding section interposed therebetween. In particular, the folding section enables the first and second rigid sections to be folded about the folding section to thereby reduce the length of the first boom sub-assembly in a storage configuration. Furthermore, the folding section is biased so as to urge the first boom sub-assembly into a deployed configuration. The boom assembly further comprises a second boom sub-assembly having a first rigid section and a folding section wherein the second boom sub-assembly is mounted to the second rigid section of the first boom sub-assembly. Moreover, the folding section of the second boom sub-assembly enables the first rigid section of the second boom sub-assembly to be folded with respect to the second rigid section of the first boom sub-assembly to reduce the length of the second boom sub-assembly with respect to the first boom sub-assembly.

In another aspect of the invention, the aforementioned needs are satisfied by the structural support member for a spacecraft boom assembly, the support member comprising a plurality of rigid sections that include a first, a second, and a third rigid section and a plurality of foldable sections that interconnect the plurality of rigid sections. In particular, the plurality of foldable sections include a first foldable section that interconnects the first and second rigid sections and a second foldable section that interconnects the second and third rigid sections. Furthermore, each of the foldable sections is formed of a resilient material having a shape that is biased into a rigid unfolded state such that the foldable sections rigidly interconnect the rigid sections so as to maintain the structural support member in a rigid deployed configuration. Moreover, each of the foldable sections is configurable into a strained folded state so as to enable the plurality of rigid members to be positioned substantially adjacent each other substantially along the lengths of the plurality of rigid members so as to place the structural support member in a storage configuration having a reduced size. Additionally, the first and second rigid sections are able to fold and unfold with respect to each other along a first plane and the second and third rigid sections are able to fold and unfold with respect to each other along a second plane such that the first and second planes intersect each other.

The spacecraft boom assembly of the present invention is formed from an improved structural element that is both bendable and compressible so as to enable the boom assembly to be easily folded into a storage configuration so that the boom assembly can be stowed within the relatively small payload space of a launching vehicle. Furthermore, since the foldable sections of the structural element are formed of a resilient material, the elastic energy stored within each of the folded foldable sections provides each of the foldable sections with a bias that urges the boom assembly to self-extend from the storage configuration to the deployed configuration. Moreover, the structural element, when in the deployed configuration, provide sufficient rigidity so that the boom assembly is capable of supporting extending components of the spacecraft. Additionally, the extendable structural element is relatively inexpensive to manufacture, is lightweight, and is capable of extending into relatively large sizes. These and other objects and advantages of the present invention will become more apparent from the following description taken in conjunction with the accompanying drawings.

BRIEF DESCRIPTION OF THE DRAWINGS

FIG. 3A is a perspective view of a structural support member of the boom assembly of the spacecraft of FIG. 2A which illustrates the structural support member in the deployed configuration;

FIG. 3D is a cross-sectional view of the foldable section of FIG. 3B in the deployed configuration;

FIG. 3E is a cross-sectional view of the foldable section of FIG. 3B in a flattened state which illustrates how the foldable section is adapted into the storage configuration;

FIG. 5A is a perspective view of one embodiment of the foldable section of FIG. 3B which further includes a torsion stiffening assembly;

FIG. 5B is an alternative perspective view of FIG. 5A;

FIG. 6A is a schematic diagram of one embodiment of a structural support member having a plurality of laterally extending rigid sections and a plurality of longitudinally extending rigid sections which generally illustrates the structural support member in the deployed configuration;

FIG. 6B is a schematic diagram of the structural support member of FIG. 6A which generally illustrates the structural support member in a partially folded state; and FIG. 6C is a schematic diagram of the structural support member of FIG. 6A which generally illustrates the structural support member in the storage configuration.

DETAILED DESCRIPTION OF THE PREFERRED EMBODIMENT

Figure 1:
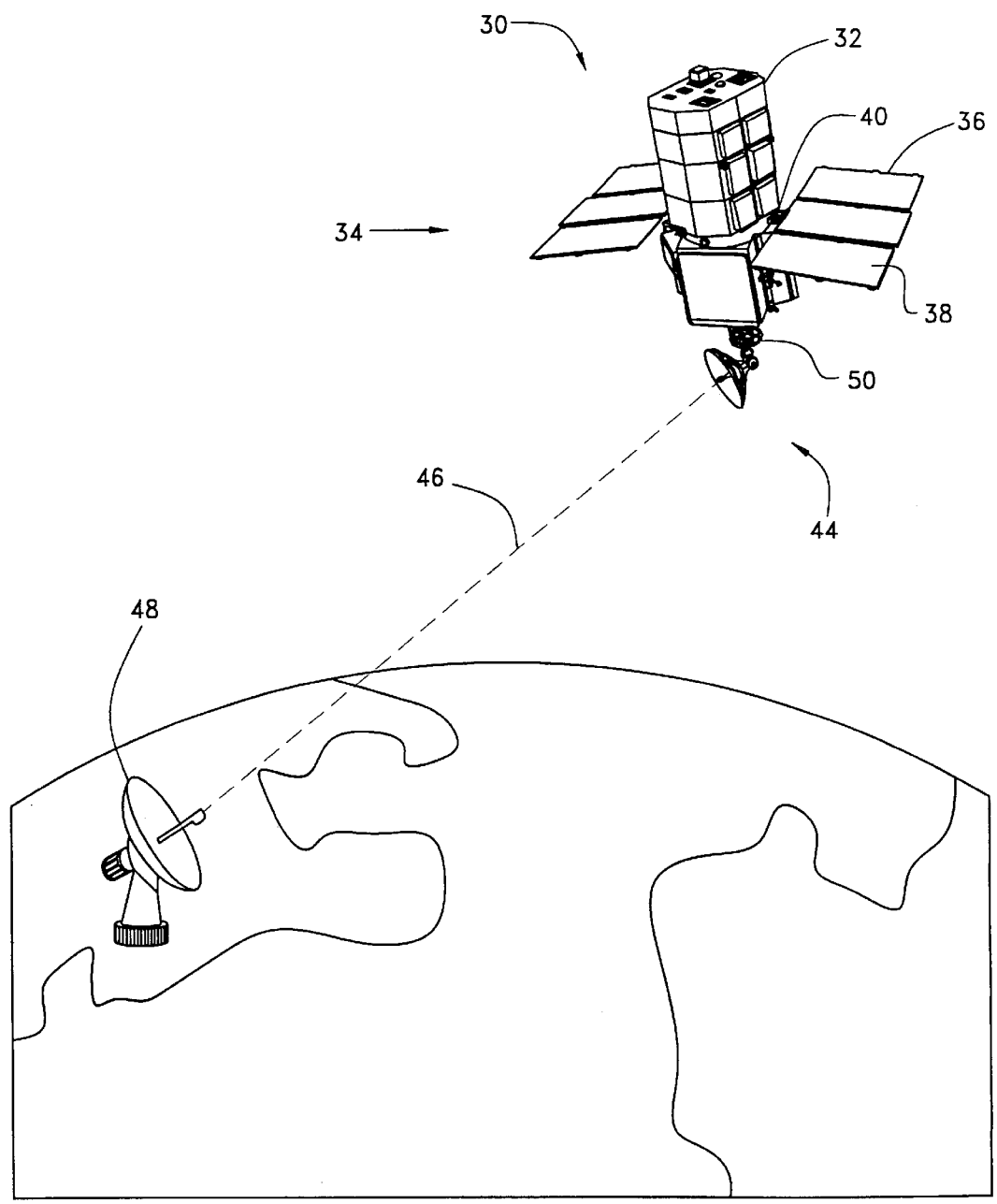
FIG. 1 is an perspective view of a typical spacecraft in a launched state.

Reference will now be made to the drawings wherein like numerals refer to like parts throughout. FIG. 1 illustrates a typical spacecraft 30 in a launched state. In particular, the spacecraft 30 is representative of many different types of space vehicles that include orbiting satellites and deep space probes. Furthermore, the spacecraft 30 is configured into the launched state in a launch phase that involves stowing the spacecraft 30 in a launch vehicle, such as a manned space shuttle or an unmanned rocket.

As shown in FIG. 1, the typical spacecraft 30 comprises a housing assembly 32 and a plurality of extending components 34 that extend from the housing assembly 32. In particular, the housing assembly 32 encloses a plurality of components that may include, for example, electronic instrumentation, scientific instrumentation, and electrical power assemblies.

As shown in FIG. 1, the extending components 34 may comprise a solar array assembly 36. In particular, the solar array assembly 36 having a plurality of solar array panels 38 is adapted to generate electrical power by converting solar radiation captured by the panels 38 into electrical energy. Furthermore, the solar array assembly 36 includes a first boom assembly 40 that extends the solar array assembly from a storage configuration (not shown) to the deployed configuration of FIG. 1 subsequent to the launch phase and provides a rigid structure so as to support and maintain the solar array panels 38 in the deployed configuration of FIG. 1.

As shown in FIG. 1, the extending components 34 of the spacecraft 30 further includes an extending antenna assembly 44. In particular, the antenna assembly 44 is adapted to send and receive a plurality of signals 46 to and from a plurality of Earth-based communication stations 48. Furthermore, the antenna assembly 44 includes a second boom assembly 50 that supports the antenna assembly 44 in a deployed configuration as shown in FIG. 1 and extends the antenna assembly 44 from a storage configuration (not shown) into the deployed configuration of FIG. 1 subsequent to the launch phase.

It will be appreciated that the support structure that maintains the solar array panel 38 and the antenna assembly 44 in the deployed configuration must be sufficiently rigid to maintain these structures in a precisely oriented deployed configuration. These and many other types of deployable structures on spacecraft must often be maintained in a desired deployed orientation while the spacecraft experiences different accelerations. Hence, not only must the support structures be able to be stowed for launch, they must also be capable of deploying and maintaining structures in a desired orientation.

Figure 2A:
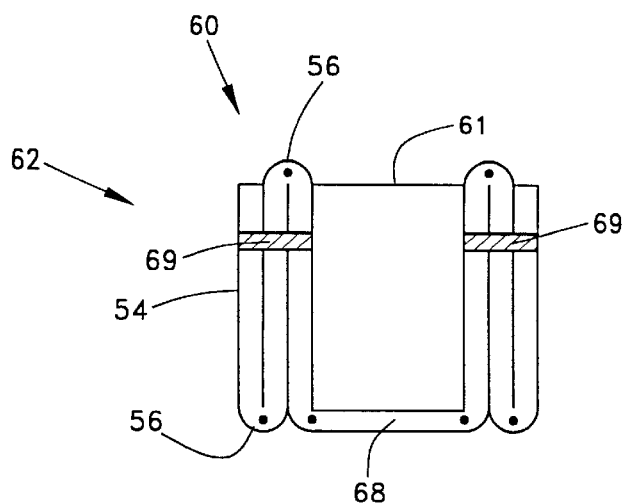
FIG. 2A is a side view of an alternative spacecraft having a boom assembly of the present invention which illustrates the boom assembly in the storage configuration.
Figure 2B:
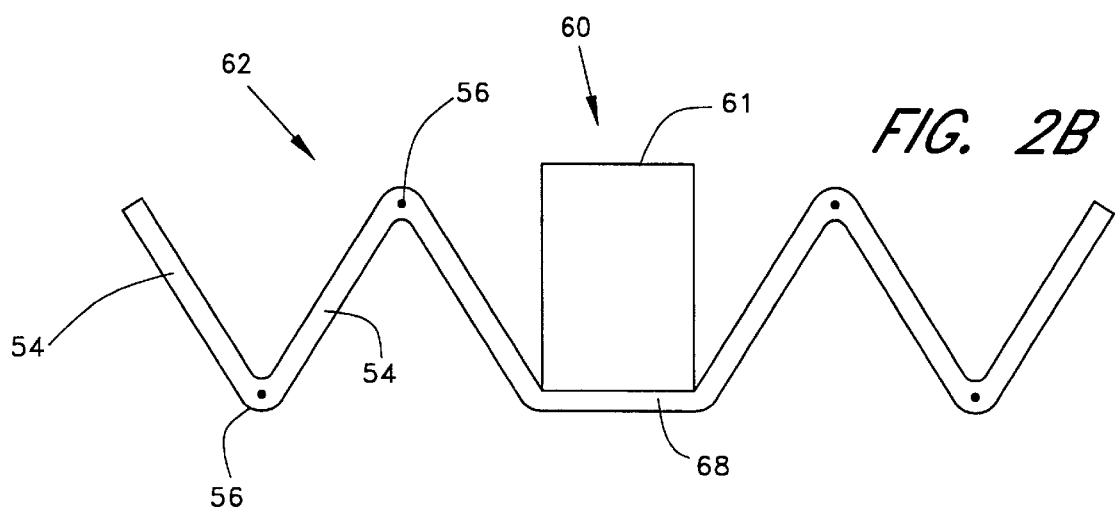
FIG. 2B is a side view of the spacecraft of FIG. 2A which illustrates the boom assembly extending between the storage configuration and a deployed configuration.
Figure 2C:
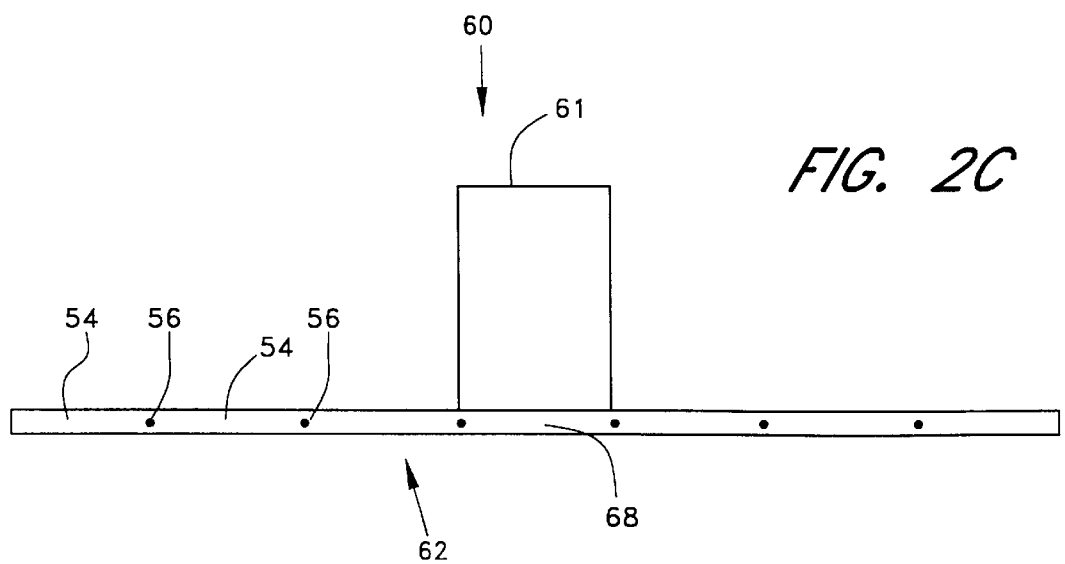
FIG. 2C is a side view of the spacecraft of FIG. 2A which illustrates the boom assembly in the deployed configuration.

Reference will now be made to FIGS. 2A–2C which illustrate another embodiment of a spacecraft 60 having a novel boom assembly 62 which is the same type of boom assembly as the assemblies 40 and 50. As will be described in greater detail below, the boom assembly 62 is able to be stored in a compact storage configuration, is lightweight, is able to self-extend into a relatively large deployed configuration, and is relatively inexpensive to produce. Furthermore, the boom assembly 62 may self-extend into a variety of shapes that include, but are not limited to, a linear shape, an elongated planer shape, and a non-elongated planer shape. Consequently, the boom assembly 62 is able to support and extend a plurality of components that may include a solar array assembly or an antenna array assembly such as those illustrated above in FIG. 1.

As shown in FIGS. 2A–2C, the spacecraft 60 comprises a housing assembly 61 and the boom assembly 62. In particular, the housing assembly 61 is substantially similar to the housing assembly 32 of the known spacecraft 30 of FIG. 1. Furthermore, the housing assembly 61 and the boom assembly 62 are coupled together as will be described in greater detail below.

As shown in FIG. 2A, the boom assembly 62 is comprised of a plurality of rigid members 54 that pivotally interconnect at a plurality of foldable members 56 so as to enable the boom assembly 62 to be placed in the storage configuration in an accordion manner. Furthermore, the rigid member 54 includes at least one mounting member 68 that mounts to the housing assembly 61 in a well-known manner so as to secure the boom assembly 62 to the housing assembly 61.

As shown in FIGS. 2A–2C, the boom assembly 62 is adapted to extend from the storage configuration of FIG. 2A to the deployed configuration of FIG. 2C. In particular, the foldable members 56 are adapted to store elastic potential energy when placed in the storage configuration of FIG. 2A so as to be biased into the deployed configuration. Thus, when the boom assembly 62 is allowed to extend, for example, by the release of a suitable latching mechanism 69, the stored elastic potential energy of the foldable members 56 will urge the boom assembly 62 to extend into the deployed configuration of FIG. 2C.

As shown in the embodiment of FIG. 2C, the boom assembly 62 extends into an elongated shape in the deployed configuration. However, in another embodiment, the boom assembly may be adapted to extend along multiple directions as will be described in greater detail below in connection with FIGS. 8A–8C.

As will be described below, the boom assembly 62 is comprised of at least one elongated extendable structural element, otherwise known as a boom, having a plurality of rigid sections and at least one foldable section integrally interposed between the rigid sections. In particular, the rigid sections of the extendable structural element form the rigid members 54 of the boom assembly 62 and the foldable sections of the extendable structural element form the foldable members 56 of the boom assembly 62.

Figures 3B, 3C:
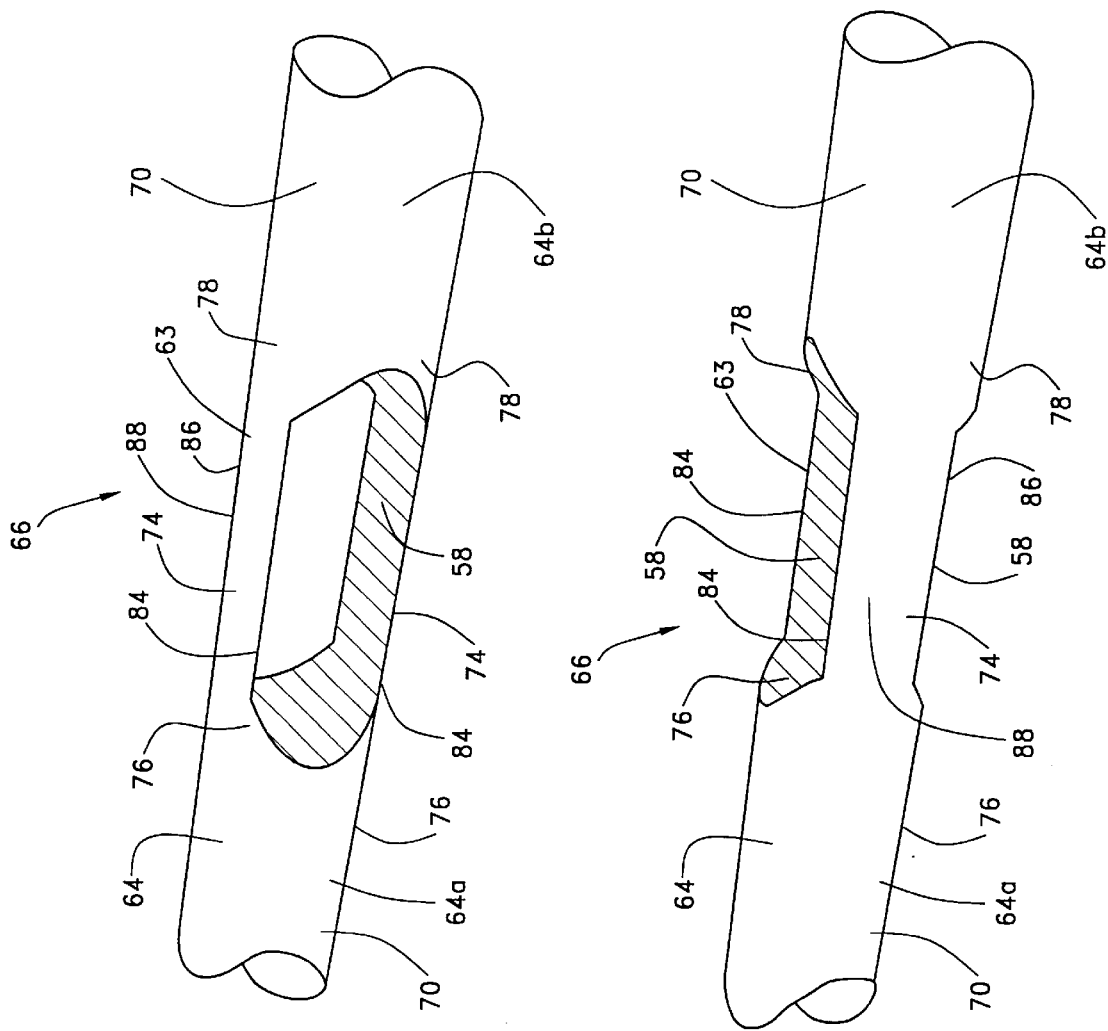
FIG. 3B is a magnified perspective view of the structural support member FIG. 3A which illustrates a foldable section of the structural support member in greater detail.
FIG. 3C is an alternative perspective view of FIG. 3B.

Reference will now be made to FIGS. 3A–3D which illustrate one embodiment of the extendable structural element 66 of the boom assembly 62. In particular, FIG. 3A is a perspective view of the extendable structural element 66 that is adapted to extend into a linear shape. Furthermore, FIGS. 3B and 3C are magnified perspective views of FIG. 3A which illustrate the foldable section 63 in greater detail. Moreover, FIG. 3D is a cross-sectional view of the foldable section 63 of FIG. 3A in a rigid configuration showing a cross-sectional profile of an adjacent tubular wall 70 in phantom.

As shown in FIG. 3A, the extendable structural element 66 is comprised of a plurality of rigid tubular walls 70 having a first end 65 and a second end 67 that form each of the rigid sections 64 of the extendable structural element 66. Furthermore, the extendable structural element 66 further comprises the at least one foldable section 63 that extends between the first and second ends 65 and 67 of adjacent rigid sections 64.

As shown in FIGS. 3B–3D, each of the foldable sections 63 comprises a pair of connecting strips 74 that each connect the rigid section 64a with the adjacent rigid section 64b. In particular, each connecting strip 74 includes a first elongated side edge 84, a second elongated side edge 86, a first end 76 that extends from the rigid member 64a, a second end 78 that extends from the rigid member 64b and a central portion 88 located midway between the first and second ends 76 and 78. Furthermore, each connecting strip 74 is biased into a shape having a concave inner surface 80 (FIG. 3D) and a convex outer surface 82 so as to resist bending in a manner that results in the elongated side edges 84 and 86 of the connecting strips 74 forming a substantially nonlinear shape.

As shown in the embodiment of FIGS. 3A–3C, the connecting strips 74 of the foldable section 63 are positioned in a generally parallel manner so that the inner surfaces 80 of each of the connecting strips 74 face each other. Consequently, in the deployed configuration of FIG. 3A, the foldable section 63 provides the extendable structural element 66 with a relatively high degree of rigidity so as to resist bending along any axis that is perpendicular to the elongated axis of the deployed extendable structural element 66. However, as will be described below, the connecting strips 74 are capable of being deformed into a flat shape so as to enable the foldable sections 63 to fold.

As best shown in FIG. 3B, the first and second ends 76 and 78 of each connecting strip 74 are constructed with a flared shape. In particular, both the first and second ends 76 and 78 extend toward the rigid sections 64 in a flared manner so that the flared first and second ends 76 and 78 join with the rigid sections 64 substantially along the entire circumference of the wall 70. Thus, the central portion 88 is able to be deformed from the biased shape of FIG. 3D such that the resulting stress is more uniformly distributed along the length of the connecting strips 74 and such that the change in the curvature of the first and second ends 76 and 78 of the connecting strips 74 is relatively small. Consequently, the first and second ends 65 and 67 of the rigid sections 64 experience a reduced stress which reduces the likelihood that the rigid sections 64 will develop stress fractures as a result of the extendable structural element 66 being placed in the storage configuration.

In one embodiment, the extendable structural element 66 is manufactured in a process that involves fabricating an initial tubular structure having an extended tubular wall so as to form the rigid sections 64. Furthermore, each foldable section 63 is integrally fabricated in the extendable structural element 66 by forming a pair of openings 58 in the tubular wall so that the remaining portion of the tubular wall adjacent the openings comprise the connecting members 74. Moreover, the initial tubular structure is preferably manufactured of a resilient material that provides rigidity in a curved shape and flexibility in a flat shape. Additionally, the initial tubular structure is preferably lightweight and capable of withstanding a large degree of mechanical strain. In one embodiment, the initial tubular structure is formed of glass fiber in an epoxy matrix.

In one embodiment, the extendable structural element 66 is formed with twenty rigid sections 64 and nineteen foldable sections 63 interposed therebetween. In particular, each rigid section 64 is formed with a tubular cross-sectional shape having a length of 100 cm, an inner diameter of 38.0 mm, and an outer diameter of 38.5 mm. Furthermore, each of the foldable sections 63 comprise two connecting strips each having a length of 5 cm, an inner radius of curvature of 38 mm, an outer radius of curvature of 38.5 mm, and a width of 15 mm. Consequently, the extendable structural element 66 is capable of extending into the deployed configuration with a length of 2.095 m and folding into the storage configuration having a width of 60 mm, a length of 105 cm, and a depth of 15 cm.

Figure 3F:
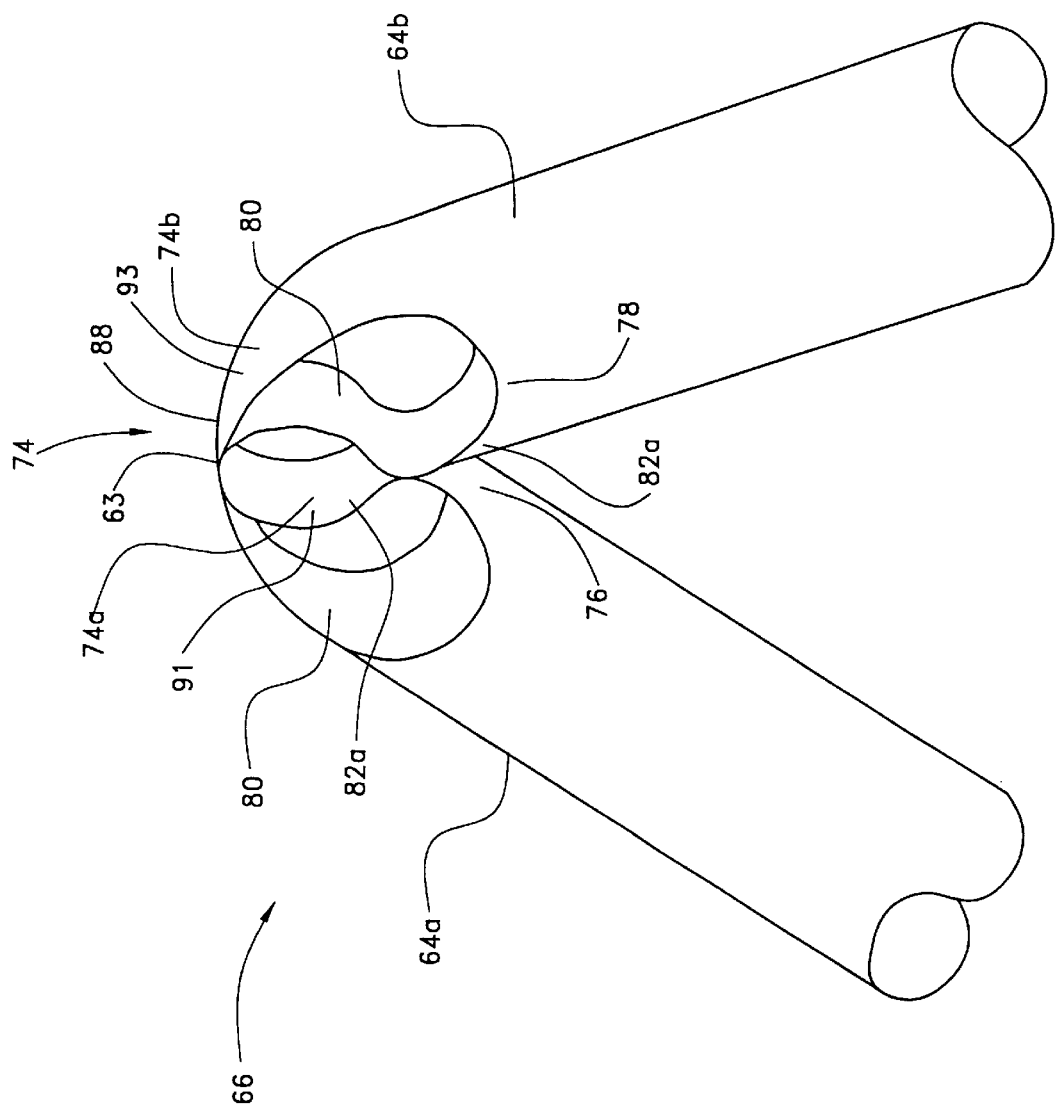
FIG. 3F is a perspective view of the foldable section of FIG. 3B in a partially folded state.

Reference will now be made to FIGS. 3E–3F which illustrate the pivoting characteristics of the foldable section 63. In particular, the foldable section 63 can be induced to fold by applying an external pair of opposing lateral forces at the outer surface 82 of the central portion 88 of each of the connecting members 74 so as to flatten the shape of the central portion 88 of the connecting strips 74 as shown in FIG. 3E. Thus, the foldable section 63 is subsequently able to be folded such that the inner surfaces 80 are flushly positioned adjacent each other in a parallel manner as shown in FIG. 3F to thereby reduce the length of the boom assembly 62. Consequently, the connecting strips 74 are placed into a strained configuration such that the connecting strip 74b forms an outer bow 93 and the connecting strip 74a forms an inner bow 91 and such that the first and second ends 76 and 78 of the inner connecting strip 74a contact each other along the outer surface 82a.

It will be appreciated that the foldable section 63 in the folded configuration of FIG. 3F possesses elastic potential energy that can subsequently provide a self-deployment mechanism. In particular, the formation of the inner and outer bows 91 and 93 result in intermolecular stretching of the material of the connecting strips 74. Furthermore, the flushly adjacent first and second ends 76 and 78 of the inner bow 91 enable reactive forces to be applied therebetween so as to enable the stored elastic energy to be more readily converted into useful work that reorients the rigid sections 64a and 64b into the deployed configuration. Thus, the stored elastic potential energy will provide the bias that enables the extendable structural element 66 and, therefore, the boom assembly 62 to self-extend from the storage configuration upon release of the latching mechanism 69 of the boom assembly 62.

Figure 3G:
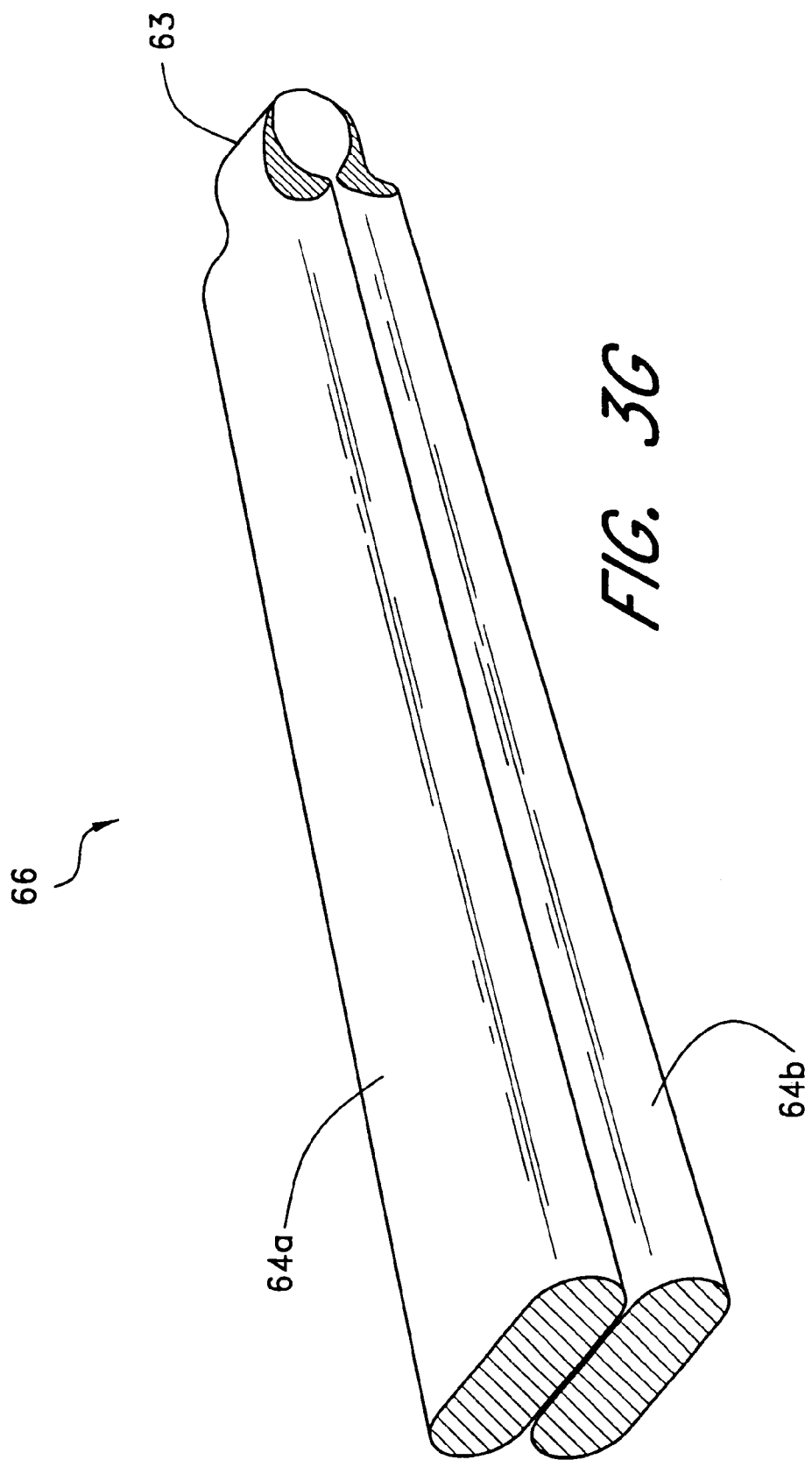
FIG. 3G is a perspective view of the foldable section of FIG. 3B in the storage configuration.

Reference will now be made to FIG. 3G which illustrates a portion of the extendable structural element 66 in the storage configuration. In particular, with the foldable section 63 initially folded in the manner of FIG. 3F, the extendable structural element 66 is configured in the storage configuration by flushly aligning the rigid member 64a with the rigid member 64b. Furthermore, the elastic characteristics of the tubular wall 70 of the rigid members 64 enable the rigid members 64 in this embodiment to be compressed into a shape having a reduced width as shown in FIG. 3G. Thus, since the extendable structural element 66 is foldable along its length and compressible along its width, the extendable structural element 66 and, therefore, the boom assembly 62 is reducible in size.

Figure 4:
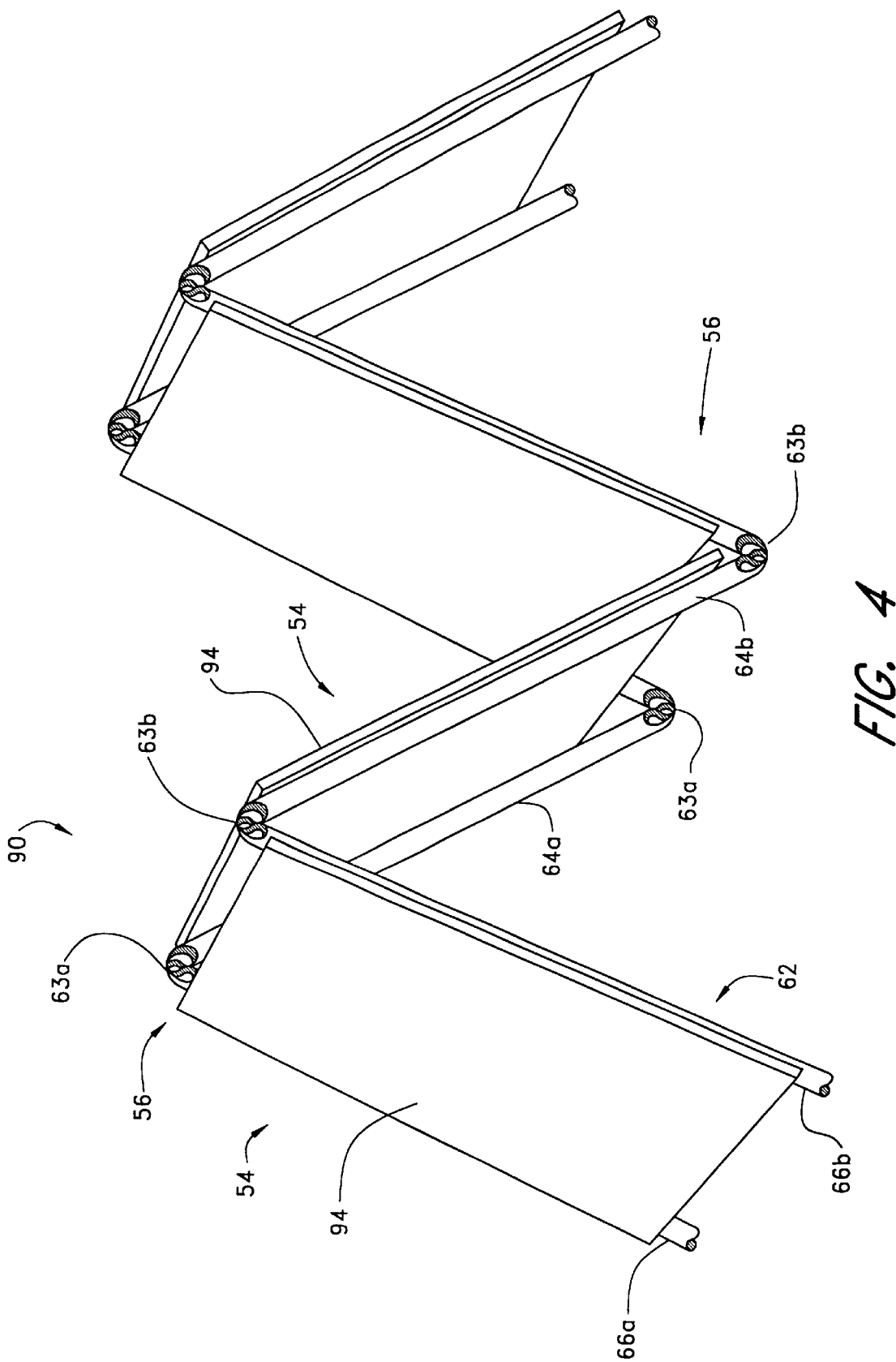
FIG. 4 is a perspective view of one embodiment of the boom assembly of FIG. 2A which forms a part of a solar panel array.

Reference will now be made to FIG. 4 which illustrates a panel assembly 90, such as a solar panel assembly, that comprises one embodiment of the boom assembly 62. In particular, the panel assembly 90 comprises a plurality of flat rigid panels 94 that are mounted as part of the boom assembly 62 so as to store and deploy the panel assembly 90.

As shown in FIG. 4, the boom assembly 62 comprises the first and second extendable structural elements 66a and 66b that are substantially similar to each other. In particular, the extendable structural elements 66a and 66b are positioned so as to be mutually aligned in a generally parallel manner so that the corresponding folding sections 63a and 63b are adjacent to each other. Furthermore, each rigid panel 94 mounts to the corresponding pair of rigid sections 64a and 64b along the opposing outer edges of the panel 94 so as to rigidly couple the rigid sections 64a and 64b of the extendable structural element 66a, 66b in a fixed relationship and so as to align the rigid sections 64a and 64b with the plane of the rigid panel 94. Consequently, each opposing pair of rigid sections 64a and 64b mounted to the corresponding rigid panel 94 combine to form each of the rigid members 54 of the boom assembly 62.

As shown in FIG. 4, the foldable sections 63a and 63b also combine to form the boom assembly 62 with each of the foldable members 56 having a pivot axis that extends between the foldable sections 63a and 63b. Thus, each of the panels 94 are capable of folding in an accordion manner so as to allow the panel assembly 90 to be placed in the storage configuration as shown in FIG. 2A.

Furthermore, since the foldable sections 63a and 63b store a sufficient amount of elastic potential energy, the stored energy will therefore provide the bias that urges the solar panel assembly 90 to freely extend into the deployed configuration of FIG. 2C. Moreover, since the foldable sections 63a and 63b are formed from resilient material that is capable of sustaining a high strain, the foldable sections 63a and 63b will recover their original curved shape so as to provide the deployed boom assembly 62 with a high degree of rigidity in the deployed configuration.

Thus, the solar panel assembly 90 is capable of folding in an accordion manner in the storage configuration such that the panels 94 are positioned adjacent to each other in a parallel manner so as to reduce the size of the panel assembly 90. Furthermore, the panel assembly 90 is capable of extending into the deployed configuration such that the panels 94 are aligned in a common plane so as to increase the surface area of the panel assembly 90.

Reference will now be made to FIGS. 5A and 5B which illustrate one embodiment of the extendable structural element 166 that includes a torsion stiffening assembly 102. In particular, the extendable structural element 166 is substantially similar to the extendable structural element 66 except for the presence of the torsion stiffening assembly 102 at each folding section 163. Furthermore, the extendable structural element 166 is adapted to replace the extendable structural element 66 in the boom assembly 62. As will be described in greater detail below, the torsion stiffening assembly 102 provides the extendable structural element 166 with a greater resistance to deforming under the presence of torsional stress.

As shown in FIGS. 5A and 5B, the torsion stiffening assembly 102 comprises a plurality of stiffening elements 104. In the embodiment of FIGS. 4A and 4B, the stiffening elements 104 comprise four stiffening elements 104a, 104b, 104c and 104d. Furthermore, the stiffening elements 104 are formed of a lightweight high strength high tension stretch resistant material, such as Kevlar or S-Glass fiber.

As shown in FIGS. 5A and 5B, when the extendable structural element 166 is placed in the deployed configuration, the stiffening elements 104a and 104b extend between the first elongated edges 184a and 184b of the connecting strips 174a and 174b in a taut diagonal manner. In particular, the stiffening element 104a rigidly couples the first end 176a of the first connecting strip 174a with the second end 178b of the second connecting strip 174b. Furthermore, the stiffening element 104b rigidly couples the second end 178a of the first connecting strip 174a with the first end 176b of the second connecting strip 174b.

As shown in FIGS. 5A and 5B, the stiffening elements 104c and 104d diagonally extend in a taut manner between the second elongated edges 186a and 186b of the connecting strips 174a and 174b. Otherwise, the stiffening elements 104c and 104d attach between the connecting strips 174a and 174b in a substantially similar manner to that of the stiffening elements 104a and 104b.

It will be appreciated that the torsion stiffening assembly 102 provides the extendable structural element 166 with increased torsional strength in the deployed configuration. In particular, since the stiffening elements 104 are diagonally mounted in a taut manner between the connecting strips 174a and 174b and since the stiffening elements 104 are resistant to stretching, the stiffening elements 104 will inhibit the first ends 176a and 176b of the connecting strips 176a and 176b from respectively being pulled away from the second ends 178b and 178a. Hence, the connecting strips 174 are inhibited from deforming under the presence of a torsional stress and the adjacent rigid members 164a and 164b of FIGS. 5A and 5B are inhibited from rotating with respect to each other about the elongated axis of the extendable structural element 166. Consequently, the extendable structural element 166 will likely maintain a rigid shape even under the presence of torsional stress producing torques. Furthermore, when the extendable structural element 166 is placed in the storage configuration, the folding motion of the first and second rigid members 164a and 164b will place the torsion stiffening assembly 102 into a loose state so as to inhibit the torsion stiffening assembly 102 from interfering in the placement of the extendable structural element 166 between the deployed configuration and the storage configuration.

Reference will now be made to FIGS. 6A–6C which schematically illustrate another embodiment of an extendable structural element 266 that is adapted to fold and extend in a multi-directional manner. In particular, the extendable structural element 266 may be used as part of a boom assembly of an antenna array assembly so as to enable the antenna assembly to be folded into a storage configuration and so as to enable the antenna assembly to be extended and supported in a deployed configuration.

As indicated in FIG. 6A, the extendable structural element 266 comprises a plurality of rigid sections 264 that are substantially similar to the rigid sections 64 of the extendable structural element of FIG. 3A. Furthermore, the extendable structural element 266 comprises a plurality of foldable sections 263 that are substantially similar to the foldable sections 63 of FIG. 3A. However, as indicated in FIG. 6A, the rigid sections 264 comprise a first plurality of rigid sections 124 and a second plurality of rigid sections 122 wherein each of the rigid sections 124 extends so as to be non-aligned with each of the extended rigid sections 122. Moreover, the foldable sections 263 comprise a first plurality of foldable sections 126 having mutually parallel folding axes and a second plurality of foldable sections 128 having mutually parallel folding axes, wherein the folding axes of the sections 126 are substantially non-aligned with the folding axes of the sections 128.

As indicated in FIG. 6A, the first rigid members 124a and 124b flexibly couple with a first end 130 of the second rigid member 122a such that the flexible members 126a and 126b are interposed therebetween. Furthermore, in this embodiment, the flexible members 126a and 126b are constructed so that their bending axes are perpendicular to the plane of FIG. 6A. Thus, the first rigid members 124a and 124b are both able to be folded along a first plane that, in this embodiment, is the plane of FIG. 6B so that first rigid members 124a and 124b align with the second rigid member 122a as shown in FIG. 6B.

As shown in FIG. 6A, the first members 124c and 124d flexibly couple with a first end 132 of the second rigid member 122b such that the flexible members 126c and 126d are interposed therebetween. Furthermore, in this embodiment, the flexible members 126c and 126d are constructed so that their bending axes are perpendicular to the plane of FIG. 6A. Thus, the lateral rigid members 124c and 124d are both able to be folded along the first plane so that they align with the second rigid member 122b as shown in FIG. 6B.

As shown in FIGS. 6A and 6B, the second rigid members 122a and 122b flexibly couple to each other such that the flexible member 128a is interposed therebetween. In particular, the flexible member 128a is constructed so that the bending axis is oriented from left to right along FIGS. 6A and 6B. Thus, the second rigid member 122a is able to be folded with respect to the second rigid member 122b along a second plane that, in this embodiment, is perpendicular to the plane of FIG. 6A such that the second rigid members 122 and the first rigid members 124 are compactly aligned adjacent to each other in a flush manner in the storage configuration as shown in FIG. 6C.

It will be appreciated that the extendable structural elements described hereinabove enable the formation of the improved spacecraft boom assembly of the present invention. In particular, the extendable structural elements are bendable and compressible so as to enable the boom assembly to be easily folded into the storage configuration so that the boom assembly can be stowed within the relatively small payload space of the launching vehicle. Furthermore, since the foldable sections of the extendable structural elements are formed of a resilient material, the elastic energy stored within each of the folded foldable sections provides each of the foldable sections with a bias that urges the boom assembly to self-extend from the storage configuration to the deployed configuration. Moreover, the extendable structural elements, when in the deployed configuration, provide sufficient rigidity so that the boom assembly is capable of supporting extending components of the spacecraft. Additionally, the extendable structural elements are relatively inexpensive to manufacture, are lightweight, and are capable of extending into relatively large sizes.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A spacecraft boom assembly comprised of an elongate boom having at least one opening formed at a location along the boom wherein the at least one opening defines at least one folding region so as to permit the elongate boom to be folded about the at least one folding region to thereby reduce the length of the elongate boom and wherein the elongate boom is formed of a resilient material so as to store elastic energy when the elongate boom is in the folded configuration to thereby bias the folded elongate boom into an unfolded deployed state.

2. The assembly of claim 1, wherein the elongate boom further defines a plurality of rigid sections such that the at least one folding region is integrally interposed between the plurality of rigid sections.

3. The assembly of claim 2, wherein the at least one opening forms at least one connecting strip that interconnects adjacent rigid sections of the plurality of rigid sections, wherein the at least one connecting strip is biased into a first cross-sectional shape that inhibits bending of the at least one connecting strip along an axis that is perpendicular to the elongated axes of the adjacent rigid sections.

4. The assembly of claim 3, wherein the at least one opening comprises two adjacent openings that form two symmetrically shaped adjacently positioned connecting strips each having a first and second end.

5. The assembly of claim 4, wherein the connecting strips form an inner bow and an outer bow when the elongate boom is placed in the storage configuration so that elastic energy stored in the inner bow and outer bow will subsequently return the elongate boom into the deployed configuration.

6. The assembly of claim 5, wherein the opposing ends of the inner bow contact each other when the elongate boom is placed in the storage configuration so as to enable the stored elastic energy to be more readily converted into mechanical work which results in the deployment of the elongate boom.

7. The assembly of claim 4, wherein the first and second ends of each of the connecting strips are formed with a flared shape so as to extend from the adjacent rigid sections substantially along the entire circumference of the adjacent rigid sections and so as to enable the central region of the connecting strips to be deformed from the first cross-sectional shape so that the adjacent rigid sections can be folded about the folding region.

8. The assembly of claim 5, wherein each rigid section is formed with a length of 100 cm, an inner diameter of 38.0 mm, and an outer diameter of 38.5 mm.

9. The assembly of claim 6, wherein each connecting strip is formed with a length of 5 cm, an inner radius of curvature of 38 mm, an outer radius of curvature of 38.5 mm, and a width of 15 mm.

10. The assembly of claim 1, wherein the elongate boom is formed from glass fiber in an epoxy matrix having a tubular shape.

11. The assembly of claim 1, wherein the elongate boom is formed so as to extend in a linear manner.

12. The assembly of claim 1, wherein the elongate boom is capable of extending into the deployed configuration with a length of 2.095 m and folding into the storage configuration having a width of 60 mm, a length of 105 cm, and a depth of 15 cm.

13. The assembly of claim 1, wherein the elongate boom is formed so as to extend along multiple directions.

14. The assembly of claim 1, wherein the elongate boom further comprises a torsion stiffening assembly.

15. The assembly of claim 14, wherein the torsion stiffening assembly comprises a plurality of torsion stiffening elements that rigidly couple a first end and a second end of the folding region so as to inhibit the distance between the first and second ends of the folding region from increasing.

16. The assembly of claim 1, further comprising a latching mechanism that is adapted to retain the boom assembly in the storage configuration while the latching mechanism is in a latched state, wherein the boom assembly extends from the storage configuration to the deployed configuration when the latching mechanism is placed into an unlatched state.

17. A spacecraft boom assembly having a storage and a deployed configuration, the assembly comprising:

a first and a second mounting member; and a foldable interconnection connected between the first and the second mounting members wherein the foldable interconnection is formed of an elastic material that is formed integrally with at least the first mounting member and in which the elastic material biases the foldable interconnection into a deployed configuration wherein the first and second mounting members are maintained in a deployed configuration such that the foldable interconnection rigidly maintains the first and second mounting members in a desired orientation with respect to each other such that the length of the boom assembly is a deployed length and wherein the foldable interconnection is adapted to permit release from the deployed configuration so that the first and second mounting members can be positioned in a storage configuration wherein the first and second mounting members can be positioned so as to reduce the length of the boom assembly.

18. The assembly of claim 17, wherein the foldable interconnection comprises at least one connecting strip that is biased into a first cross-sectional shape that inhibits bending of the at least one connecting strip along an axis that is perpendicular to the elongated axes of the first and second mounting members.

19. The assembly of claim 18, wherein the at least one connecting strip comprises two symmetrically shaped adjacently positioned connecting strips each having a first and second end.

20. The assembly of claim 19, wherein the connecting strips form an inner bow and an outer bow when the boom assembly is placed in the storage configuration so that elastic energy stored in the inner bow and outer bow will subsequently return the boom assembly into the deployed configuration.

21. The assembly of claim 20, wherein the opposing ends of the inner bow contact each other when the boom assembly is placed in the storage configuration so as to enable the stored elastic energy to be more readily converted into mechanical work which results in the deployment of the boom assembly.

22. The assembly of claim 19, wherein the first and second ends of each of the connecting strips are formed with a flared shape so as to extend from the first and second mounting members substantially along the entire circumference of the first and second mounting members and so as to enable the central region of the connecting strips to be deformed from the first cross-sectional shape so that the first and second mounting members can be folded about the foldable interconnection.

23. An elongate structural support member for a spacecraft comprising:
a first rigid member having a first and a second end;
a second rigid member having a first and a second end;
a foldable connecting member integrally attached to the first ends of the first and second rigid members so as to interconnect the first and second rigid members, wherein the foldable connecting member is bendable so as to allow the first and second rigid members to be positioned substantially adjacent each other substantially along the lengths of the first and second rigid members in a storage configuration and wherein the foldable connecting member is biased towards a deployed configuration wherein the first rigid member is rotated about the connecting member with respect to the second rigid member so that the first and second rigid members extend outward from the foldable connecting member.

24. The structural support member of claim 23, wherein the foldable connecting member is formed of a resilient material that is biased into a first cross sectional shape such that when the first and second rigid members are in the deployed configuration, the foldable connecting member has the first cross sectional shape which retains the first and second rigid members in the deployed configuration.

25. The structural support member of claim 24, wherein the foldable connecting member is released from the first cross sectional shape by exertion of force against a surface of the foldable connecting member to thereby allow the foldable connecting member to be folded to permit the first and second rigid members to be positioned in the storage configuration.

26. The structural support member of claim 25, wherein the first and second rigid members are formed of a resilient material that is biased into a second cross sectional shape such that when the first and second rigid members are in the deployed configuration, the first and second rigid members have the second cross sectional shape which provides the first and second rigid members with improved rigidity.

27. The structural support member of claim 26, wherein the first and second rigid members are released from the second cross sectional shape while the structural support member is placed in the storage configuration so as to reduce the size of the structural support member.

28. The structural support member of claim 27, wherein the connecting member comprises a first connecting strip having a first and second end and a second connecting strip having a first and second end, wherein the first end of the first and second connecting strips extend into the first end of the first rigid member, and wherein the second end of the first and second connecting strips extend into the first end of the second rigid member.

29. The structural support member of claim 28, wherein the first and second ends of each connecting strip is formed with a flared shape so as to more easily enable the connecting member to be released from the first cross-sectional shape so as to more easily enable the connecting member to be folded and so as to prevent stress fractures from forming along the first and second rigid members.

30. The structural support member of claim 29, wherein the first and second rigid members are formed of a thin walled tubular shaped material so that the second cross-sectional shape of the first and second rigid members is annular.

31. The structural support member of claim 30, wherein each of the connecting strips are formed with a concave inner surface and a convex outer surface, wherein the inner and outer surfaces are shaped so as respectively align in a substantial manner with the inner and outer surfaces of the first and second rigid members.

32. The structural support member of claim 31, wherein the first and second rigid members and the foldable connecting member are integrally formed from glass fiber in an epoxy matrix.

33. The structural support member of claim 32, further comprising a torsion stiffening assembly that provides additional torsional strength so as to inhibit a torsional stress from deforming the structural support member while in the deployed configuration.

34. The structural support member of claim 33, wherein the torsion stiffening assembly comprises a plurality of stiffening members that attach across the foldable connecting member in a diagonal manner so as to respectively couple the first and second ends of the first connecting member with the second and first ends of the second connecting member.

35. The structural support member of claim 34, wherein the first and second rigid members are each formed with a length of 100 cm, an inner diameter of 38 mm, an outer diameter of 38.5 mm.

36. The structural support member of claim 35, wherein the first and second connecting strips are formed with a length of 5 cm, an inner diameter of 38 mm, an outer diameter of 38.5 mm, and a width of 15 mm.

37. The structural support member of claim 23, wherein the first and second rigid members coaxially extend from each other in the deployed configuration.

38. The structural support member of claim 23, wherein the first and second rigid members perpendicularly extend from each other in the deployed configuration.

39. A boom assembly for a spacecraft comprising:
a first boom sub-assembly having a first and a second rigid section with a folding section interposed therebetween and integrally formed with the first and second rigid sections wherein the folding section enables the first and second rigid sections to be folded about the folding section to thereby reduce the length of the first boom sub-assembly in a storage configuration and wherein the folding section is biased so as to urge the first boom sub-assembly into a deployed configuration; and
a second boom sub-assembly having a first rigid section and a folding section wherein the second boom sub-assembly is mounted to the second rigid section of the first boom sub-assembly wherein the folding section of the second boom sub-assembly enables the first rigid section of the second boom sub-assembly to be folded with respect to the second rigid section of the first boom sub-assembly to reduce the length of the second boom sub-assembly with respect to the first boom sub-assembly.

40. The assembly of claim 39, wherein the first and second rigid members in the first boom sub-assembly extend in a first direction when the first boom sub-assembly is in the deployed configuration.

41. The assembly of claim 40, wherein the first rigid member of the second boom sub-assembly extends in a second direction, other than the first direction when the second boom sub-assembly is in the deployed configuration.

42. The assembly of claim 41, wherein the boom assembly is formed from glass fiber in an epoxy matrix having a tubular shape.

43. A structural support member for a spacecraft boom assembly, the support member comprising:
 a plurality of rigid sections that include a first, a second, and a third rigid section; and
 a plurality of foldable sections that interconnect the plurality of rigid sections and which are integrally formed with the plurality of rigid sections, wherein the plurality of foldable sections include a first foldable section that interconnects the first and second rigid sections and a second foldable section that interconnects the second and third rigid sections, wherein each of the foldable sections is formed of a resilient material having a shape that is biased into a rigid unfolded state such that the foldable sections rigidly interconnect the rigid sections so as to maintain the structural support member in a rigid deployed configuration, wherein each of the foldable sections is configurable into a strained folded state so as to enable the plurality of rigid members to be positioned substantially adjacent each other substantially along the lengths of the plurality of rigid members so as to place the structural support member in a storage configuration having a reduced size such that the first and second rigid sections are able to fold and unfold with respect to each other along a first plane and such that the second and third rigid sections are able to fold and unfold with respect to each other along a second plane, wherein the first and second planes intersect each other.

44. The assembly of claim 43, wherein the structural support member further comprises a torsion stiffening assembly.

45. The assembly of claim 44, wherein the torsion stiffening assembly comprises a plurality of torsion stiffening elements that rigidly couple a first end and a second end of each foldable section.

46. The assembly of claim 43, further comprising a latching mechanism that is adapted to retain the structural support member in the storage configuration while the latching mechanism is in a latched state, wherein the structural support member is allowed to extend from the storage configuration to the deployed configuration when the latching mechanism is placed into an unlatched state.

47. An elongate structural support member for a spacecraft comprising:
 a first rigid section having a first and a second end and a first bending stiffness about an axis normal to the first rigid section;
 a second rigid section having a first and a second end and a second bending stiffness about an axis normal to the second rigid section;
 a foldable section connecting the first end of the first rigid section to the first end of the second rigid section, wherein the foldable section has a bending stiffness about an axis normal to the foldable section that is less than the first bending stiffness and the second bending stiffness, the foldable section being bendable so as to allow the first and second rigid sections to be positioned substantially adjacent each other in a first configuration wherein the foldable section stores elastic potential energy, and wherein the stored elastic potential energy biases the foldable section toward a second configuration wherein the first rigid section is rotated about the foldable section with respect to the second rigid section so that the first and second rigid sections extend outward from the foldable section.

48. The elongate structural support member of claim 47 wherein the foldable section comprises a pair of connecting strips.

49. The elongate structural support member of claim 48 wherein each of the pair of connecting strips is biased into a shape having a concave inner surface and a convex outer surface so as to resist bending about an axis normal to the foldable section of the elongate member.

50. A spacecraft boom assembly comprising an elongate boom and a means for facilitating the folding of the boom at a folding section, said folding of the boom permitting the length of the boom to be reduced in the folded configuration, and said folding also storing elastic energy in the folding section of the boom, the stored elastic energy biasing the folding section to an unfolded configuration.

51. The spacecraft boom assembly of claim 50 wherein the means for facilitating folding comprises a region of the boom constructed with reduced flexural stiffness.

52. A hinge element for a structural support for a spacecraft comprising a foldable member connecting a first section of the structural support to a second section of the structural support, wherein the foldable member is bendable so as to allow the first and second sections of the structural support to be positioned substantially adjacent each other in a first configuration of the hinge element and wherein the foldable member provides a bias towards a second configuration wherein the first section of the support is rotated about the foldable section with respect to the second section of the support so that the first and second sections of the support extend outward from the folding member.

* * * * *